(12) United States Patent
Ligh

(10) Patent No.: US 6,173,736 B1
(45) Date of Patent: Jan. 16, 2001

(54) DIAPHRAGM ACTUATED PRESSURE RELIEF VALVE WITH PRESSURE BALANCED OUTLET AND FAIL-SAFE OPERATION

(76) Inventor: J. Yen Ligh, 12634 Ashford Pine Dr., Houston, TX (US) 77082

( * ) Notice: Under 35 U.S.C. 154(b), the term of this patent shall be extended for 0 days.

(21) Appl. No.: 09/300,369

(22) Filed: Apr. 27, 1999

(51) Int. Cl.[7] ................................................ F16K 17/04
(52) U.S. Cl. ........................ 137/494; 251/86; 251/118
(58) Field of Search ................................. 137/494, 495; 251/86, 118

(56) References Cited

U.S. PATENT DOCUMENTS

| | | |
|---|---|---|
| 1,531,273 | 3/1925 | Clifford et al. . |
| 1,669,739 | 5/1928 | Clark . |
| 1,890,311 | 12/1932 | Blake . |
| 1,918,807 | 7/1933 | Glab . |
| 2,271,516 | 2/1942 | Tobin et al. . |
| 2,499,527 * | 3/1950 | Raymond ............................. 137/494 |
| 2,877,978 | 3/1959 | Rider et al. . |
| 3,075,544 | 1/1963 | Heideman . |
| 3,115,154 | 12/1963 | Dillon . |
| 3,583,432 | 6/1971 | Powell et al. . |
| 4,312,375 | 1/1982 | Leinemann . |
| 4,445,531 | 5/1984 | Powell . |
| 4,949,750 | 8/1990 | Goodwin et al. . |
| 5,048,560 | 9/1991 | Jannotta et al. . |
| 5,094,267 | 3/1992 | Ligh . |
| 5,108,071 * | 4/1992 | Hutchings ............................. 251/86 |
| 5,163,471 | 11/1992 | Powell . |
| 5,249,593 | 10/1993 | Higgins et al. . |
| 5,253,672 | 10/1993 | Uehara et al. . |
| 5,443,090 | 8/1995 | Ligh . |
| 5,511,581 | 4/1996 | Ligh . |
| 5,845,675 | 12/1998 | Ligh . |

FOREIGN PATENT DOCUMENTS

| | | |
|---|---|---|
| 19 63 849 | 10/1977 | (DE) . |
| 827282 | 2/1960 | (GB) . |
| 739489 | 6/1980 | (SU) . |

OTHER PUBLICATIONS

Fisher Controls, Type 630R Relief Valve, Dec. 1970 Bulletin 71.4:630R.
Fisher Controls, 289 Series Spring–Loaded Relief Valves, Jan. 1977, Bulletin 71.4:289.
Fisher Controls, Type 1266 Self–Operated Backpressure Regulator or Relief Valve, Nov. 1982, bulletin 71.4:1266.

* cited by examiner

*Primary Examiner*—Stephen M. Hepperle
(74) *Attorney, Agent, or Firm*—Kenneth H. Johnson

(57) ABSTRACT

A diaphragm/spring operated pressure relief valve having a sensing passage of substantially the same flow area as the outlet orifice of the valve whereby failure of either diaphragm results in "fail open" configuration with the addition of a sensing inlet shroud located to capture the total pressure at the inlet and channel it to the sensing chamber to allow the valve to relieve full rated capacity in the event the sensing diaphragm is ruptured.

31 Claims, 2 Drawing Sheets

DIAPHRAGM ACTUATED PRESSURE RELIEF VALVE WITH PRESSURE BALANCED OUTLET AND FAIL-SAFE OPERATION

BACKGROUND OF THE INVENTION

1. Field of the Invention

The present invention relates to a diaphragm/spring actuated pressure relief valve or back-pressure regulator that is pressure balanced against the outlet pressure for use on tanks where the outlet may be exposed to a pressure or vacuum that can vary in magnitude having improved pressure sensing.

2. Related Art

There are many types of diaphragm/spring actuated pressure relief valves.

The outlet ports of two such commercial valves are unbalanced against outlet pressure, i.e., the opening point of the valves are affected (changed) by the amount of pressure or vacuum on the outlet side due to the valve seat being biased to the outlet pressure. If the diaphragm of either valve ruptures, the spring will keep the valve closed and it will not be able to relieve the full rated capacity of the valve. The most that one of these valves can relieve is the amount that can flow through the small passageway(s) that leads to the diaphragm chamber. In the other valve the maximum relief capacity is whatever can flow through the small threaded port in the spring bonnet, assuming the internal passageways are larger than the spring bonnet port.

A third valve type utilizes a balancing diaphragm to overcome the effects of varying outlet pressure. If the main diaphragm ruptures, the spring will keep the valve closed and it will not be able to relieve the full rated capacity of the main valve. The most that the valve can relieve is the amount that can flow through the relatively small passageways leading to the main diaphragm. Therefore a ruptured main diaphragm can be hazardous and compromise the safety of the system that the valve is intended to protect by not being able to relieve the unwanted pressure build-up.

One of the criteria of determining how well a pressure relief valve performs is the amount of "overpressure" or accumulation required to achieve a certain relieving capacity. "Overpressure" or accumulation is that increment of pressure higher than the set pressure, which is the pressure at which the valve begins to open. Most relief valves that bear the ASME UV stamp, whether they are spring loaded or pilot operated, are rated for capacity at 10% overpressure. Weight loaded tank vents, valves that are closed by a weighted cover over the opening, require a significant overpressure to have meaningful flow for its size. At 10% overpressure weight loaded tank vents do not flow much. Some designs require as much as 50% to over 100% overpressure for significant flow. Prior designs of weight or spring loaded pressure relief valves are not able to open very wide at relatively small overpressures because when the valve opens and relieves, the full tank pressure is not communicated to the sensing chamber or seat due to pressure drops along the sensing path. A smaller more efficient valve can often times be used in place of a larger valve of lower efficiency resulting in savings in cost, weight, and space requirements, with associated benefits.

U.S. Pat. No. 5,845,675 discloses a diaphragm/spring operated pressure relief valve having a sensing passage of substantially the same flow area as the outlet orifice of the valve whereby failure of either diaphragm results in "fail open" configuration. The present diaphragm/spring actuated pressure relief valve uses the same features of U.S. Pat. No. 5,845,675 with the addition of a shrouded sensing inlet located to capture the total pressure at the valve inlet and channel it to the sensing chamber. This arrangement reduces the pressure drop along the sensing path which allows the sensing diaphragm to more accurately sense the tank pressure and lift open the valve seat wider when an increase in tank pressure is sensed, thereby improving the performance of the valve.

SUMMARY OF THE INVENTION

The present invention is a diaphragm/spring actuated pressure relief valve comprising a body having an inlet and an outlet;

an outlet orifice located within said body and having a flow area;

a rectilinearly movable seat seal having a seat area aligned to cooperatively engage and close said outlet orifice;

a stem mounted on said seat seal at a proximal end;

a flexible balancing diaphragm attached to said stem;

a flexible sensing diaphragm attached to said stem;

a spring mounted to said sensing diaphragm in axial alignment with a distal portion of said stem;

a sensing passage comprising a shroud extending into and aligned with said inlet and concurrently connecting said inlet with said balancing diaphragm and said sensing diaphragm;

wherein said sensing passage has the same or larger flow area than the larger of said outlet orifice or said inlet.

As used herein the term "effective area" of a diaphragm with a stem attached normal thereto means the area that when multiplied by the pressure will give the force applied to the stem.

PREFERRED EMBODIMENT

Figure 1:
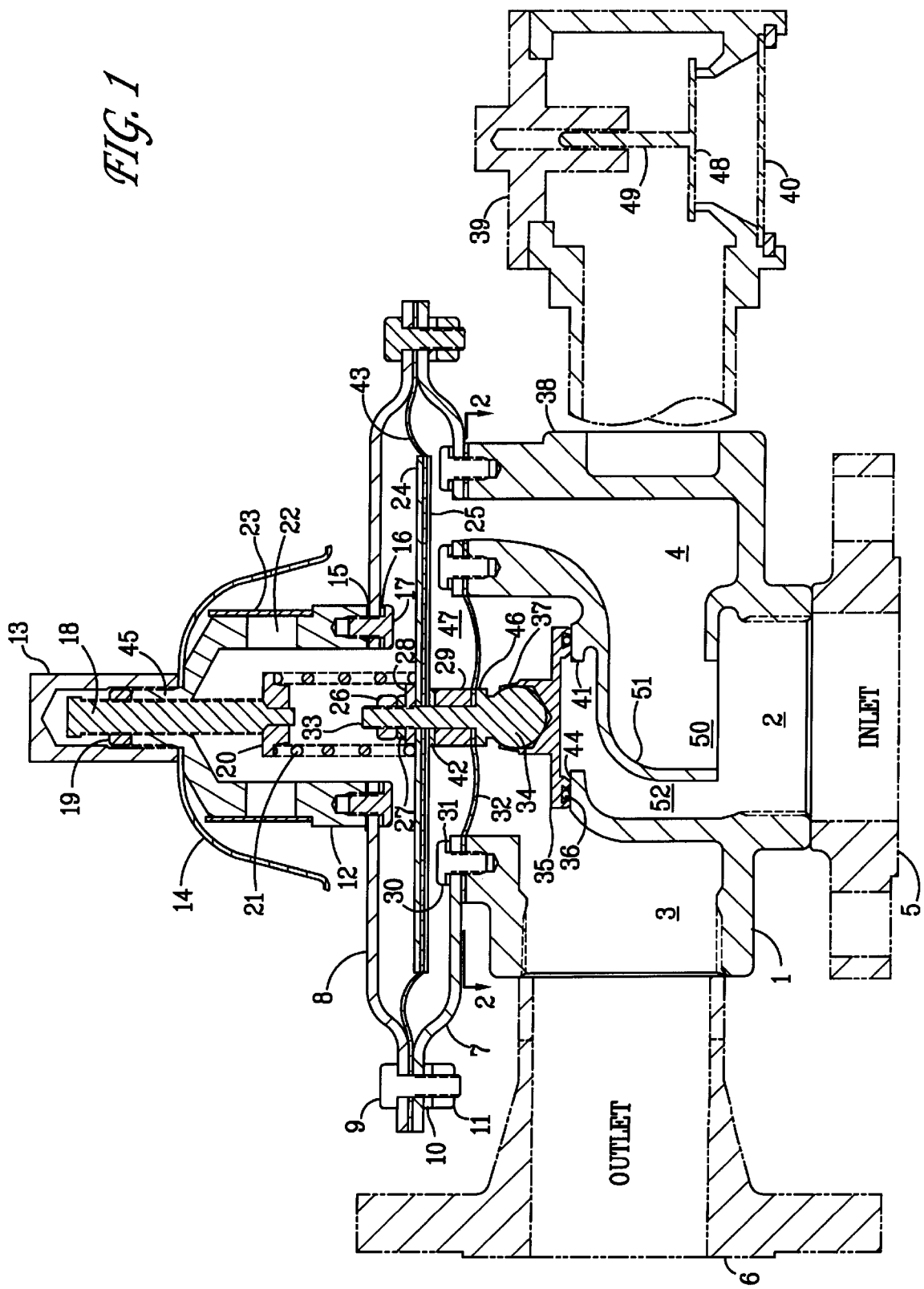
FIG. 1 is an elevational view in partial cross section of one embodiment of the invention.
Figure 2:
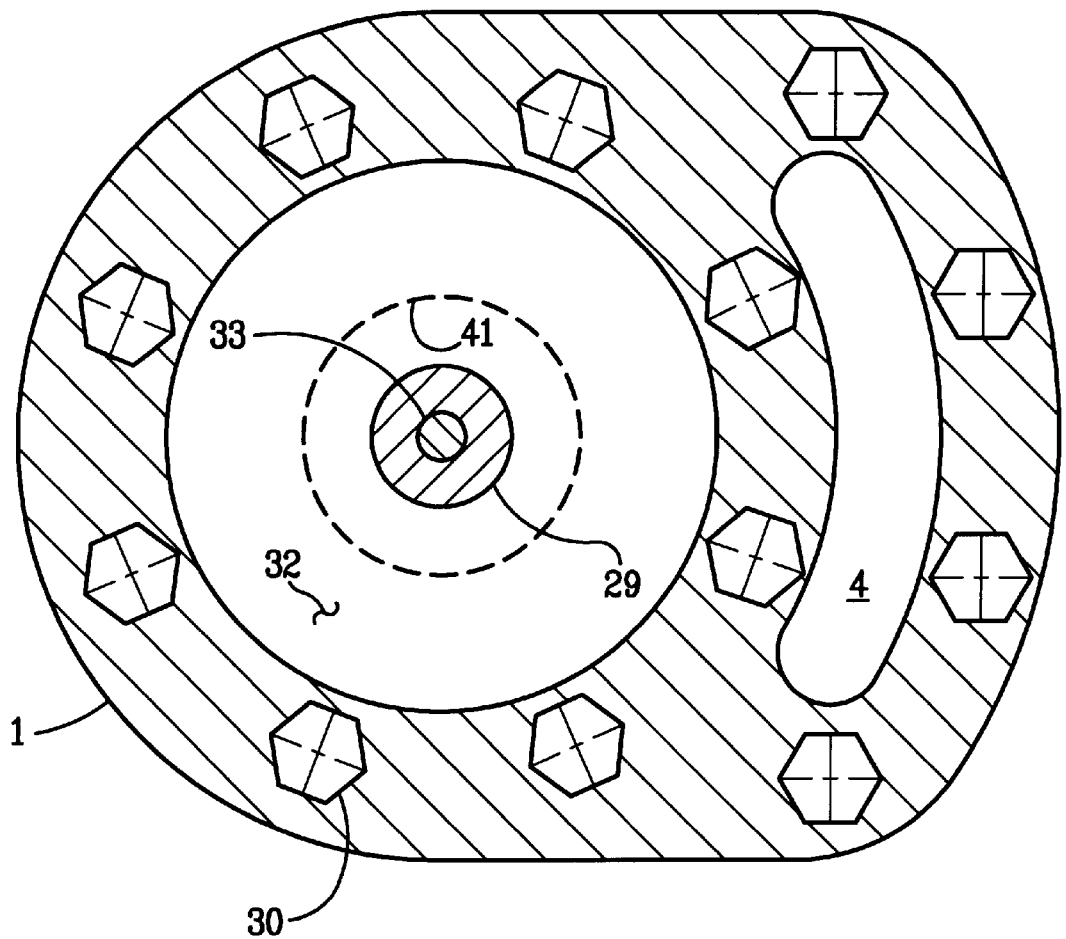
FIG. 2 is a partial cross sectional view along line 2—2 of FIG. 1.

A detailed description of a preferred embodiment is provided by reference to FIG. 1, which shows an elevational view in partial cross section of one embodiment of the present diaphragm/spring actuated pressure relief valve or back-pressure regulator.

The valve body 1 has an inlet 2, an outlet 3 and sensing/vacuum passageway positioned between inlet 2 and the underside of sensing diaphragm 43. The sensing diaphragm is mounted by clamping it about its periphery between upper diaphragm case 8 and lower diaphragm case 7 which are secured together by bolts 9, lockwashers 10 and nuts 11, spaced around their circumferences. The diaphragm case is mounted to body 1 by bolts 30 and lockwashers 31 through lower diaphragm case 7.

FIG. 1 shows an optional flange 6 welded to the outlet and a similar optional flange 5 welded onto inlet 2. Other means of attachment (not shown) would include a threaded nipple.

A spring bonnet 12 having atmospheric openings 22 is mounted to the upper diaphragm case 8 by bolts 17 and lock washers 16. The bonnet 12 is sealed to the case by rain gasket 15. A weather hood 14 is provided to keep rain or snow away from the openings 22. A neck 45 covered by cap 13 extends from the upper end of the spring bonnet 12 through which the set pressure adjusting screw 18 is threaded. The spring 21 is mounted within the bonnet 12 between the pressure support plate 24 at the lower end and the spring button 20 at the upper end. Weights (not shown) rather than spring 21 can be attached to the upper side of the pressure support plate 24 to determine the set pressure. The set pressure adjusting screw 18 extends into and bears against the spring button 20. The set pressure adjusting screw bears against the spring button 20 which bears against the spring 21 which finally exerts a downward force on pressure support plate 24 and thus sensing diaphragm 43. The spring guide washer 28 holds the spring in place on the pressure support plate 24.

Valve stem 33 extends from the ball end 34 which is secured to seat retainer 35. The stem 33 passes through balancing diaphragm 32, spacer 29, gasket 42 and vacuum support plate 25, sensing diaphragm 43 and pressure support plate 24. The whole is secured together by nut 26, lockwasher 27 and spring guide washer 28. Shoulder 46 at lower end of stem 33 above the ball end 34 bears against the balancing diaphragm 32 and tightens and seals the components along the stem 33 when nut 26 is tightened.

As shown in FIG. 1 the valve is closed with the seat retainer 35 biased against the seating surface 44 by the spring 21.

Lip 37 is crimped to form a socket around ball end 34 to form a self-aligning joint to allow the seat retainer 35 to press evenly against the seat seal 36 to effect a tight seal against the seating surface 44. Boss 38 is supplied for a vacuum breaker. Conceptual vacuum breaker 39 having screen 40 is shown in dotted lines. Sensing diaphragm 43 has an "effective area" greater than that of the balancing diaphragm 32. One or both the sensing diaphragm 43 and the balancing diaphragm 32 may be substituted with diaphragms of the "rolling" type (rolling diaphragms) to achieve the same end result.

In the present invention the inlet pressure enters the valve at the inlet 2. The pressure is channelled to the lower side of the sensing diaphragm 43 and above the balancing diaphragm 32 via the sensing/vacuum passageway 4. The tank pressure via inlet 2 is pushing upward against the force of the set pressure spring 21 and downward against the balancing diaphragm 32. The same pressure is applied upwards against the seat retainer 35. The balancing diaphragm along with its support is configured such that the "effective area" is preferably the same as the seat area created by seat seal 36. With a given positive pressure at the outlet 3, the pressure is pushing up against the balancing diaphragm 32 with substantially the same force as it is pushing down over the seat area around seat seal 36. A change in the magnitude of outlet pressure at outlet 3 has no tendency to further open or close the valve, thus the valve is balanced against outlet pressure. The same is true with a vacuum at the outlet 3. The same vacuum tending to pull down on the balancing diaphragm 32 is also pulling up on the seat retainer 35, thus balancing the valve against a vacuum as well as pressure at the outlet 3. When the net force acting upwards against the sensing diaphragm 43 (backed by the pressure support plate 24) exceeds the force of the set pressure spring 21 acting downward, the valve will open to relieve. The compression of the set pressure spring 21 may be adjusted by turning the set pressure adjusting screw 18 and locking it in place with jam nut 19 to achieve the desired opening point that is within the capability of the set pressure spring 21. For higher set pressures a stronger spring may be used.

In addition to having an outlet that is pressure balanced, another advantage of the present invention is its safety features. In the event that the set pressure spring breaks and/or one or both diaphragms rupture, the valve will relieve pressure. One feature of this invention is the shroud 51 which provides the entry into sensing/vacuum passageway 4. Sensing inlet 50 is sized and configured such that the minimum flow area along the passageway 4 is substantially the same or larger than the area of the outlet orifice 41 or the inlet 2. The sensing inlet 50 is positioned to align with the valve inlet 2 to capture the total pressure at the valve inlet and channel it to the sensing chamber 47. The sensing shroud 51 helps channel the pressure to chamber 47 and to reduce any influence from the flow going up the primary pressure relieving passageway 52. The path from above the sensing diaphragm 43 through the spring bonnet 12 and through openings 22 is sized and configured to be substantially the same or larger than the area of the outlet orifice 41. In the event the sensing diaphragm 43 ruptures there will be sufficient flow area to channel the pressure out of the valve inlet 2. In the event the balancing diaphragm 32 ruptures there is a sufficiently large flow area to channel the pressure out through the outlet port via passageway 4 through the chamber 47 between balancing diaphragm 32 and the sensing diaphragm 43.

The following are potential failure modes and the valve's reaction:

1. The set pressure spring 21 breaks:

without a downward force to close the valve, the valve will open with pressure in the inlet side.

2. The balancing diaphragm 32 ruptures:

pressure can escape along the sensing/vacuum passageway, through the rupture in the balancing diaphragm, and out through the outlet port. A pin hole puncture in the balancing diaphragm 32 will not cause any disruption in the operation of the relief valve other than the presence of a continuous small leak from the inlet to the outlet side of the valve. If a tear or hole is about 2 cm in diameter, massive leakage will flow from the inlet to the outlet side of the valve through the tear in the balancing diaphragm 32. If the inlet pressure rises sufficiently to overcome the downward force of the spring 21 the seat retainer 35 will lift open and additional flow will go out the valve orifice 41 as well as through the tear in the diaphragm 32. If the balancing diaphragm 32 is ruptured all around, the volume of fluid that can flow through the rupture is at least equal to the volume that can flow through the outlet orifice 41. Unless the valve is undersized the seat retainer 35 has no need to lift open since the rupture in the balancing diaphragm 32 is large enough to flow the rated capacity of the valve.

3. The sensing diaphragm 43 ruptures:

pressure can escape along the sensing/vacuum passageway, through the rupture, through the openings 22 in the spring bonnet 12, and out through the screen 23. A pin hole puncture in the sensing diaphragm 43 will not cause any disruption in the operation of the relief valve other than the presence of a continuous small leak into the atmosphere through openings 22 in the spring bonnet 12. If a tear or hole is about 2 cm in diameter, massive leakage will flow from the inlet into the atmosphere through openings 22 in the spring bonnet 12. If the inlet pressure rises sufficiently to overcome the downward force of the spring 21 the seat retainer 35 will lift open and additional flow will go out through orifice 41 as well as through the tear in the diaphragm 43. The large sensing inlet 50 will also allow the valve to relieve full rated capacity in the event the sensing diaphragm 43 is ruptured.

In the event that it is not desirable or permissible to vent the full rated capacity to the atmosphere through the spring bonnet, but venting a lesser amount is, and a build-up of pressure on the inlet side of the valve is also allowable and safe, the screen 23 may be replaced with a sleeve or screen that is more restrictive to flow but allows the chamber above the sensing diaphragm to "breathe" during normal operation. In the alternative the vent from the spring bonnet may be connected to a manifold to recover any vapors vented therethrough.

Under normal operation the valve will remain closed in the event a vacuum exists on the inlet side of the valve. A boss 38 is provided for a vacuum breaker. A conceptual vacuum breaker 39 is shown by the dotted lines. The boss 38 can be machined for the attachment of a vacuum breaker. The vacuum breaker has an inlet closure 48 which is slidably mounted by stem 49 to open when a predetermined vacuum is reached in the tank through passageway 4. While a weight loaded vacuum breaker is shown, a spring operated vacuum breaker could also be used.

The invention claimed is:

1. A diaphragm spring actuated pressure relief valve comprising:
    a body having an inlet and an outlet;
    an outlet orifice located within said body and having a flow area;
    a rectilinearly movable seat seal having a seat area aligned to cooperatively engage and close said outlet orifice;
    a stem mounted on said seat seal at a proximal end;
    a flexible balancing diaphragm attached to said stem;
    a flexible sensing diaphragm attached to said stem;
    a spring mounted to said sensing diaphragm in axial alignment with a distal portion of said stem and
    a sensing passage comprising a shroud extending into and aligned with said inlet and concurrently connecting said inlet with said balancing diaphragm and said sensing diaphragm;
    wherein said sensing passage has the same or larger flow area than the larger of said outlet orifice or said inlet.

2. The diaphragm/spring actuated pressure relief valve according to claim 1 wherein said flexible sensing diaphragm is larger than said balancing diaphragm.

3. The diaphragm/spring actuated pressure relief valve according to claim 1 wherein said sensing diaphragm is sealed in a chamber open on one side to the atmosphere and on the other side to said sensing passage, said opening to the atmosphere being the same or larger than said outlet orifice.

4. The diaphragm/spring actuated pressure relief valve according to claim 1 wherein said proximal end of said stem comprises a ball which is mounted in a socket on said seal seat to form a self aligning joint.

5. The diaphragm/spring actuated pressure relief valve according to claim 1 wherein an adjustable screw is operably associated with said spring for adjusting the pressure sensitivity of the valve.

6. The diaphragm/spring actuated pressure relief valve according to claim 1 wherein the balancing diaphragm and said seat area have the same effective area.

7. The diaphragm/spring actuated pressure relief valve according to claim 2 wherein said sensing diaphragm is sealed in a chamber open on one side to the atmosphere and on the other side to said sensing passage, said opening to the atmosphere being the same or larger than said outlet orifice.

8. The diaphragm/spring actuated pressure relief valve according to claim 2 wherein said proximal end of said stem comprises a ball which is mounted in a socket on said seal seat to form a self aligning joint.

9. The diaphragm/spring actuated pressure relief valve according to claim 2 wherein an adjustable screw is operably associated with said spring for adjusting the pressure sensitivity of the valve.

10. The diaphragm/spring actuated pressure relief valve according to claim 2 wherein the balancing diaphragm and said seat area have the same effective area.

11. The diaphragm/spring actuated pressure relief valve according to claim 3 wherein said proximal end of said stem comprises a ball which is mounted in a socket on said seal seat to form a self aligning joint.

12. The diaphragm/spring actuated pressure relief valve according to claim 3 wherein an adjustable screw is operably associated with said spring for adjusting the pressure sensitivity of the valve.

13. The diaphragm/spring actuated pressure relief valve according to claim 3 wherein the balancing diaphragm and said seat area have the same effective area.

14. The diaphragm/spring actuated pressure relief valve according to claim 4 wherein an adjustable screw is operably associated with said spring for adjusting the pressure sensitivity of the valve.

15. The diaphragm/spring actuated pressure relief valve according to claim 4 wherein the balancing diaphragm and said seat area have the same effective area.

16. The diaphragm/spring actuated pressure relief valve according to claim 5 wherein the balancing diaphragm and said seat area have the same effective area.

17. The diaphragm/spring actuated pressure relief valve according to claim 8 wherein said sensing diaphragm is sealed in a chamber open on one side to the atmosphere and on the other side to said sensing passage, said opening to the atmosphere being the same or larger than said outlet orifice.

18. The diaphragm/spring actuated pressure relief valve according to claim 9 wherein said proximal end of said stem comprises a ball which is mounted in a socket on said seal seat to form a self aligning joint.

19. The diaphragm/spring actuated pressure relief valve according to claim 10 wherein said proximal end of said stem comprises a ball which is mounted in a socket on said seal seat to form a self aligning joint.

20. The diaphragm/spring actuated pressure relief valve according to claim 9 wherein the balancing diaphragm and said seat area have the same effective area.

21. The diaphragm/spring actuated pressure relief valve according to claim 11 wherein the balancing diaphragm and said seat area have the same effective area.

22. The diaphragm/spring actuated pressure relief valve according to claim 14 wherein the balancing diaphragm and said seat area have the same effective area.

23. The diaphragm/spring actuated pressure relief valve according to claim 22 wherein said sensing diaphragm is sealed in a chamber open on one side to the atmosphere and on the other side to said sensing passage, said opening to the atmosphere being the same or larger than said outlet orifice.

24. The diaphragm/spring actuated pressure relief valve according to claim 22 wherein said flexible sensing diaphragm is larger than said balancing diaphragm.

25. The diaphragm/spring actuated pressure relief valve according to claim 24 wherein said sensing diaphragm is sealed in a chamber open on one side to the atmosphere and on the other side to said sensing passage, said opening to the atmosphere being the same or larger than said outlet orifice.

26. The diaphragm/spring actuated pressure relief valve according to claim 1 wherein said balancing diaphragm has the same or larger area than that encompassed by said seat area.

27. The diaphragm/spring actuated pressure relief valve according to claim 1 further comprising a vacuum breaker attached to said body and in fluid communication with said sensing passage.

28. The diaphragm/spring actuated pressure relief valve according to claim 3 further comprising a flow line connected to said opening to collect any vapors that vent therethrough.

29. A diaphragm actuated pressure relief valve comprising:

- a body having an inlet and an outlet;
- an outlet orifice located within said body and having a flow area;
- a rectilinearly movable seat seal having a seat area aligned to cooperatively engage and close said outlet orifice;
- a stem mounted on said seat seal at a proximal end;
- a flexible balancing diaphragm attached to said stem;
- a flexible sensing diaphragm attached to said stem;
- a biasing means mounted to said sensing diaphragm and
- a sensing passage comprising a shroud extending into and aligned with said inlet and concurrently connecting said inlet with said balancing diaphragm and said sensing diaphragm;
- wherein said sensing passage has the same or larger flow area than the larger of said outlet orifice or said inlet.

30. The diaphragm actuated pressure relief valve according to claim 29 wherein said biasing means comprises a weight.

31. The diaphragm actuated pressure relief valve according to claim 29 wherein said biasing means comprises a spring.

* * * * *